(12) United States Patent
Stirling-Gallacher

(10) Patent No.: US 8,027,403 B2
(45) Date of Patent: Sep. 27, 2011

(54) EQUALISING STRUCTURE AND METHOD WITH MAXIMUM LIKELIHOOD DETECTION

(75) Inventor: Richard Stirling-Gallacher, Esslingen (DE)

(73) Assignee: Sony Deutschland GmbH, Berlin (DE)

( * ) Notice: Subject to any disclaimer, the term of this patent is extended or adjusted under 35 U.S.C. 154(b) by 924 days.

(21) Appl. No.: 11/912,788

(22) PCT Filed: Dec. 19, 2005

(86) PCT No.: PCT/EP2005/013667
§ 371 (c)(1),
(2), (4) Date: Oct. 26, 2007

(87) PCT Pub. No.: WO2006/117020
PCT Pub. Date: Sep. 11, 2006

(65) Prior Publication Data
US 2008/0198952 A1    Aug. 21, 2008

(30) Foreign Application Priority Data
Apr. 29, 2005 (EP) .................................. 05009491

(51) Int. Cl.
*H04B 7/02* (2006.01)
*H04L 1/02* (2006.01)
(52) U.S. Cl. ........ 375/267; 375/229; 375/347; 370/334; 455/101
(58) Field of Classification Search .................. 375/267, 375/229, 347, 260; 455/101
See application file for complete search history.

(56) References Cited

U.S. PATENT DOCUMENTS
7,590,204 B2 * 9/2009 Monsen ........................ 375/350
(Continued)

FOREIGN PATENT DOCUMENTS
EP  1 592 191 A1  11/2005
EP  1 703 686 A1  9/2006

OTHER PUBLICATIONS
U.S. Appl. No. 12/376,129, filed Feb. 3, 2009, Stirling-Gallacher.
(Continued)

*Primary Examiner* — Ted M Wang
(74) *Attorney, Agent, or Firm* — Oblon, Spivak, McClelland, Maier & Neustadt, L.L.P.

(57) ABSTRACT

The present invention relates to an equalizing structure (10) and method for a receiving device of a wireless communication system, in which two or more information signals are transmitted in parallel from one or more transmitters, wherein for the information signals transmit information is modulated onto carrier signals according to a modulation scheme, whereby all possible data symbols are represented as constellation points in the signal constellation of the modulation scheme and whereby the equalizing structure (10) performs, for each information signal, a maximum likelihood detection in order to determine a constellation point with a minimum Euclidean distance to a received signal vector as a most likely received signal vector by searching over the whole set of possible transmit signals, $S_m$, the equalizing structure (10) comprises means (11) for detecting channel estimation information in the information signals and means. (31) for calculating the product of channel matrix, $H_m$, and transmit signal vector, $s_m$, based on the channel estimation information detected by the detecting means (11), wherein the calculating means (31) calculates the product of channel matrix, $H_m$, and transmit signal vector, $s_m$, in at, least two steps, wherein in the first step a partial product of channel matrix, $H_m$, and transmit signal vector, $s_m$, based on at least one or a part of the channel estimation information detected by the detecting means (11) is calculated. The reference signals used for channel estimation are sent from the different transmitter antennas with time offset from each other.

14 Claims, 5 Drawing Sheets

U.S. PATENT DOCUMENTS

2003/0072382 A1     4/2003  Raleigh et al.
2005/0243943 A1*   11/2005  Stirling-Gallacher ........ 375/267

OTHER PUBLICATIONS

U.S. Appl. No. 12/376,125, filed Feb. 3, 2009, Stirling-Gallacher.
U.S. Appl. No. 12/376,131, filed Feb. 3, 2009, Stirling-Gallacher.
Xiaodong Li, et al., "Reduced-Complexity Detection Algorithms for Systems Using Multi-Element Arrays", Global Telecommunications Conference (Globecom 2000), XP-001017249 A, Nov. 27-Dec. 1, 2000, pp. 1072-1076.
Junqiang Li, et al., "Multi-Stage Low Complexity Maximum Likelihood Detection for OFDM/SDMA Wireless LANs" IEEE International Conference on Communications, vol. 4, XP-10553509 A, Feb. 11-14, 2001, pp. 1152-1156.
Geert Awater, et al., "Reduced Complexity Space Division Multiplexing Receivers", IEEE Vehicular Technology Conference (Spring VTC' 2000), vol. 1, May 18, 2000, pp. 11-15.
Jacky Ho-Yin Fan, et al., "Near Maximum Likelihood Detection Schemes for Wireless MIMO Systems", IEEE Transactions on Wireless Communications, vol. 3, No. 5, Sep. 2004, pp. 1427-1430.
Jacky Ho-Yin Fan, et al., "A Sub-Optimum MLD Detection Scheme for Wireless MIMO Systems", IEEE International Symposium on Advances in Wireless Communications (ISWC), 2002, 2 pages.
Arogyaswami, Paulraj et al., "Introduction to space-time wireless communications", Cambridge University Press, Chapter 7.4, "Recievers: MIMO", XP002348364, pp. 148-159, 2003.

* cited by examiner

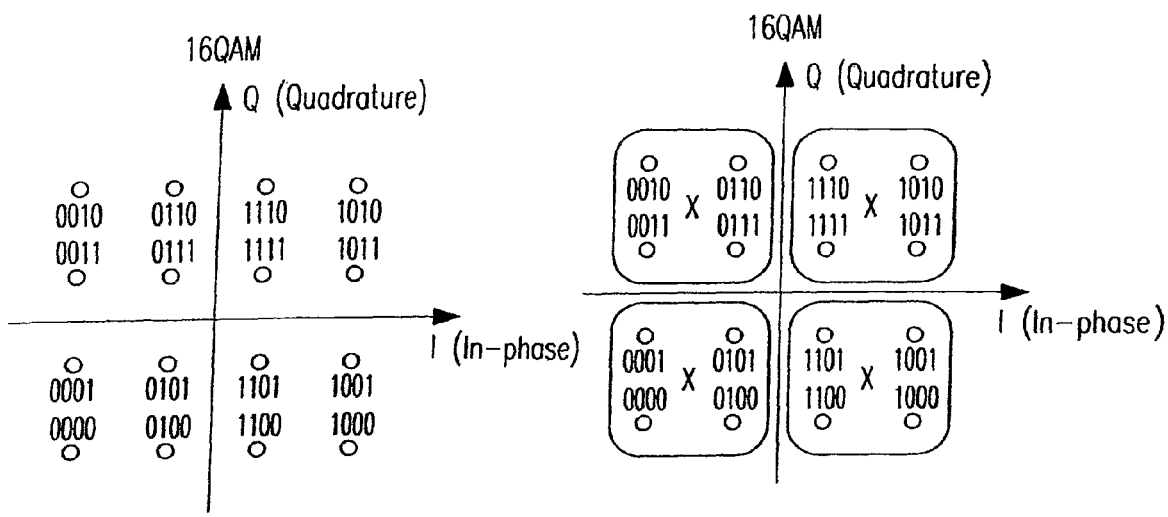
Fig. 6
Fig. 7
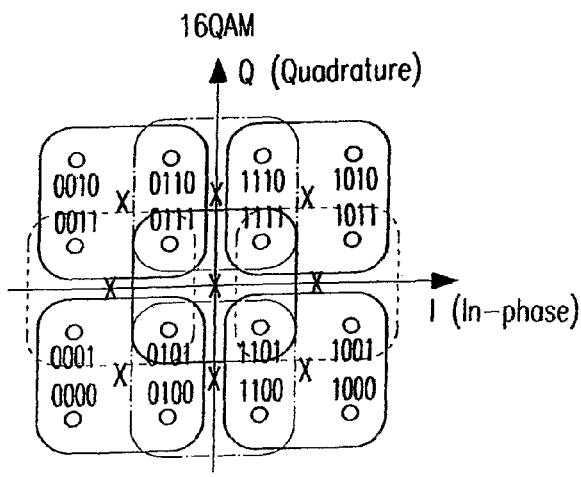
Fig. 8
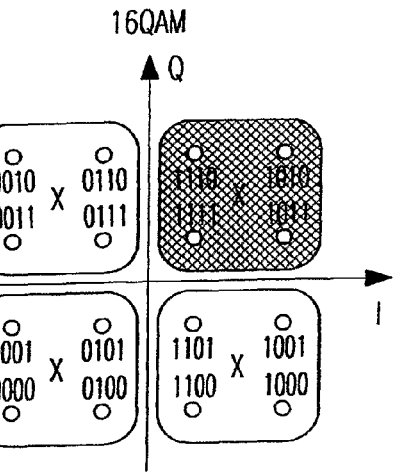
Fig. 9

EQUALISING STRUCTURE AND METHOD WITH MAXIMUM LIKELIHOOD DETECTION

FIELD OF INVENTION

The present invention relates to an equalising structure and method for a receiving device of a wireless communication system and a system of transmitting and receiving device, in which transmit information is modulated onto carrier signals according to a modulation scheme, whereby all possible data symbols are represented as constellation points in the signal constellation of the modulation scheme and whereby the equalising structure performs a maximum likelihood detection in order to determine a constellation point with a minimum Euclidean distance to a received signal vector as a most likely received signal vector.

BACKGROUND OF THE INVENTION

Equalising structures with maximum likelihood detection (MLD) are typically (but not exclusively) used in communication systems in which two or more independent symbols are transmitted in parallel from one or more transmitters within the same time slot and the same frequency band. In such cases, the symbols interfere with each other. Although such interference is generally not desirable in communication systems, it is in some systems used to increase the data rate, the spectral efficiency and/or the system throughput. Examples of such systems are so-called multiple-input, multiple-output (MIMO) systems, code division multiple access (CDMA) systems and orthogonal frequency division multiplexing-code division multiple access (OFDM-CDMA) systems.

Generally, a MIMO system has $n_T$ transmitting antennas (each transmitting a different data symbol) and $n_R$ receiving antennas. Such a system has a maximum achievable data rate, which is $n_T$ time greater than an equivalent non-MIMO system. For example, in a MIMO system which has two transmitting antennas ($n_T=2$) and two receiver antennas ($n_R=2$), the maximum achievable data rate is two times higher than in a non-MIMO system. FIG. 1 shows the schematic block diagram of such a MIMO system for transmitting two independent symbols in parallel.

The example MIMO system shown in FIG. 1 comprises a receiver 1 and a transmitter 20 for wireless communication on the basis of orthogonal frequency division multiplexing (OFDM). The receiver 1 comprises a radio frequency (RF) part 2 and a base band part 3. The radio frequency part 2 has two antennas 4 and 5, each being connected to a low noise amplifier/downconversion unit 6 and 7, respectively. It is to be noted, that the receiver 1 can e.g. be part of a pure receiving device, or can be part of a receiving and transmitting device. In the later case, the antennas 4 and 5 are receiving as well as transmitting antennas. The downconverted signals from the units 6 and 7 are respectively forwarded and processed by a fast fourier transformation unit (FFT) 8 and 9, respectively. The transformed signals from the fourier transformation units 8 and 9 are forwarded to an equalising structure 10 and a channel estimator 11. The channel estimator 11 performs, based on the receive signal (burst) including training sequences (preamble section), the channel estimation, wherein the channel estimator 10 uses the training sequence (or reference pilots) to derive the channel estimate. Signals from the channel estimator 11 are supplied to the equalising structure 10. The equalising structure 10 performs a maximum likelihood detection in order to determine a constellation point of the signal constellation of the modulation scheme with a minimum Euclidean distance to a received signal vector as a most likely received signal vector. The specific processing is explained further below. After the equalising processing, the signals are further respectively processed in a demodulator/channel decoder 12 and 13, respectively. The output signals from the demodulator/channel decoders 12 and 13, respectively, are forwarded to a parallel/serial processing unit 14, which outputs the received data bit stream.

The example OFDM transmitter 20 schematically shown in FIG. 1 comprises a radio frequency part 21 and a base band part 22. In the base band part 22, transmit data are split into two parallel data bit streams by a serial/parallel converter 23. The two parallel data bit streams output from the converter 23 are respectively supplied to a channel coder/modulator 24 and 25, respectively. The coded and modulated signals are supplied to an inverse fast fourier transformation (IFFT) unit 26 and 27, respectively, which supply the transform signals to a respective digital/analogue-converter (DAC) and filter unit 28 and 29, respectively. The analogue filtered signals are then forwarded to a respective upconversion/power amplifying unit 30 and 31, respectively, which transmit the amplified signals via a respective transmit antenna 32 and 33, respectively. It is to be noted, that the transmitter 20 can be part of a transmitting and receiving device and the antennas 32 and 33 can be receiving as well as transmitting antennas.

As indicated by the dotted line in FIG. 1, the signals transmitted in parallel interfere with each other. For general MIMO systems the received signal column vector for each symbol is given by x having $n_R$ rows, wherein each row of the vector represents the received signal for each of the receiver antennas. The received signal x is given by, $$x = Hs + n \quad (1)$$

where s is the column vector ($n_T \times 1$) of the sent signal, H is the channel matrix ($n_R \times n_T$), representing the channel response from each of the transmitter antennas to the receiving antennas and n is the noise vector ($n_R \times 1$).

For the case of OFDM systems (an example of which is shown in FIG. 1), we shall denote the number of sub-carriers as M. We shall refer to the received baseband signal at sub-carrier m (m=1, ... , M) as the received column vector $x_m$ ($n_R \times 1$). Each row element of the vector is the signal from the FFT output corresponding to the $m^{th}$ sub-carrier for each receiver output at the receiver. The receiver vector $x_m$ can therefore be expressed as, $$x_m = H_m s_m + n_m \quad (2)$$

where $s_m$ is sent signal vector ($n_T \times 1$), $H_m$ is the channel matrix ($n_R \times n_T$), and $n_m$ is the noise vector ($n_R \times 1$). Each row element of the sent signal vector $s_m$ corresponds to the input signal of the IFFT corresponding to the $m^{th}$ sub-carrier for each transmitter. The elements of the channel matrix $H_m$ correspond to the different channel responses from the elements of the transmitted vector to the elements of the received vector. It is therefore the combination of the IFFT, the multi-path channel and the FFT. It accounts for the combined effect of the IFFT, the multi-path channel and the FFT. It is well known, that for OFDM systems that such a combination leads to a channel matrix $H_m$ whose elements $h_{m,ij}$ (i=1 ... $n_R$, j=1 ... $n_T$) are single complex values. For the example shown in FIG. 1 with two transmitting antennas 32, 33 and two receiving antennas 4, 5, the received signal for carrier in can be written as, $$x_m = \begin{bmatrix} x_{m,1} \\ x_{m,2} \end{bmatrix} = \begin{bmatrix} h_{m,11} & h_{m,12} \\ h_{m,21} & h_{m,22} \end{bmatrix} \begin{bmatrix} s_{m,1} \\ s_{m,2} \end{bmatrix} + \begin{bmatrix} n_{m,1} \\ n_{m,2} \end{bmatrix} \quad (3)$$

For each sub-carrier m, the normal state-of-the-art maximum likelihood detector searches over the whole set of possible transmit signals $s_m \in A$ (where A is the set of all possible transmit vectors) to decide in favour of the transmit signal vector $\hat{s}_m$ which has the minimum Euclidean distance to the receive vector $x_m$, $$\hat{s}_m = \arg\min_{s_m \in A} \|x_m - H_m s_m\|^2 \quad (4)$$

The size of the possible transmit signal set A, containing all of the possible sent signal vectors depends upon the number of possible sent symbols from each antenna (which depends upon the modulation constellation size) and the number of transmit antennas $n_T$. The number of possible sent signals vectors is given by, $$NSV = \text{Number of possible sent signal vectors} = (\text{Modulation Constellation Size})^{n_T} \quad (5)$$

Therefore for higher-level modulation schemes with more than two antennas, the set size can be extremely large and the number of comparisons needed to be performed for each sub-carrier in equation (4) is given by $$\text{Number of comparisons} = NSV - 1 = (\text{Modulation Constellation Size})^{n_T} - 1 \quad (6)$$

To summarise, table 1 shows the number of comparisons that have to be made in equation (4) for each sub-carrier for the commonly used modulation schemes BPSK, QPSK, 16 QAM and 64 QAM.

TABLE 1

Number of comparisons for each sub-carrier for the MLD algorithm

| Modulation Scheme | Antennas ($n_T$, $n_R$) | | |
|---|---|---|---|
| | 2, 2 | 3, 3 | 4, 4 |
| BPSK | 3 | 7 | 15 |
| QPSK | 15 | 63 | 255 |
| 16QAM | 255 | 4095 | 65535 |
| 64QAM | 4095 | 262143 | $1.7 \times 10^7$ |

Before the comparisons for each sub-carrier in equation (4) can be performed, the vector products $H_m s_m$ have to be formed for each of the possible sent signals $s_m (s_m \in A)$. Since the elements of $H_m (h_{m,ij} (i=1 \ldots n_R, j=1 \ldots n_T))$ cannot be known perfectly at the receiver, they have to be estimated and this is traditionally achieved using a pilot tones. The elements of $H_m$ at the receiver are therefore denoted by $\hat{h}_{m,ji} (i=1 \ldots n_R, j=1 \ldots n_T)$. The vector $H_m s_m$ is a $(n_R \times 1)$ vector and is therefore given by, $$H_m s_m = \begin{bmatrix} \hat{h}_{m,11} & \cdots & \cdots & \hat{h}_{m,1n_T} \\ \cdots & \cdots & \cdots & \cdots \\ \cdots & \cdots & \cdots & \cdots \\ \hat{h}_{m,n_R 1} & \cdots & \cdots & \hat{h}_{m,n_R n_T} \end{bmatrix} \cdot \begin{bmatrix} s_{m,1} \\ \cdots \\ \cdots \\ s_{m,n_T} \end{bmatrix} = \begin{bmatrix} Hs_{m,1} \\ \cdots \\ \cdots \\ Hs_{m,n_T} \end{bmatrix} \quad (7)$$

Since $H_m$ is a $(n_R \times n_T)$ matrix containing complex values and $s_m$ is a $(n_T \times 1)$ vector containing complex values, the total number of real multiplications and real additions to form $H_m s_m$ for all sent signal vectors is given as follows:

Total real multiplications $= 4 \times n_R \times n_T \times (\text{Modulations Constellation Size})^{n_T}$ (8)

Total real additions $= n_R \times ((4 \times n_T) - 2) \times (\text{Modulation Constellation Size})^{n_T}$ (9)

To summarise, there are therefore two high complexity parts of the MLD algorithm (as described by equation (4)), which have to be performed for each received sub-carrier of a multi-carrier system. These are summarised as follows:

Part one: The large number of multiplications and additions of equation (7) (see equations (8) and (9), which are needed to generate the $H_m s_m$ products).

Part two: The large number of comparisons, which are required (see equation (6)).

Both these high complexity parts need to be performed M times, where M corresponds to the total number of sub-carriers. As can be seen from the above, the complexity of the prior art maximum likelihood detection schemes used in equalising structures for receiving devices in wireless communication systems is very high. Therefore, the prior art proposes several ways of reducing the complexity for maximum likelihood detection processing for multiple-input, multiple-output type systems:

Xiaodong, Li, H. C. Huang, A. Lozano, G. J. Foschini, "Reduced Complexity Detection Algorithms for Systems Using Multi-Element Arrays", Global Telecommunications Conference (Globecom 2000), San Francisco, USA, 27-Nov.-1 December, pp. 1072-1076. This paper proposes two types of algorithms. The first algorithm uses Adaptive Group Detection (AGD), which places the possible transmitted signals from the different transmitter antennas into groups. The interference between the groups is then suppressed using interference cancellation or projection techniques. MLD detection is then performed within each group. Since MLD is only performed on a sub-set of the total transmitter antennas, the complexity is reduced. The second algorithm called Multi-step Reduced Constellation Detection performs the processing in a number of steps. The first step uses zero forcing techniques (alternatively MMSE or matched filtering can be used) and provides the second step with a coarse estimate of the sent constellation points from the different transmitter antennas. The second step then uses MLD on neighbours of the coarse estimate obtained from the zero forcing stage. Since MLD is only performed in the second stage using the nearest neighbours of the coarse estimation as candidates complexity is reduced.

G. Awater, A. van Zelst, Richard van Nee, "Reduced Complexity Space Division Multiplexing Receivers", IEEE Vehicular Technology Conference (Spring VTC' 2000), Tokyo, Japan, 15-18 May 2000 Vol. 1. pp. 11-15. This paper describes three different algorithms for reducing the complexity of Maximum Likelihood Detection (MLD). The first algorithm uses a 2-D tree approach to represent the mathematical metrics (from the MLD equation) for the different possible sent sequences. Subsequent lower branches of the tree include the signals from an increasing number of transmit antennas. Maximum Likelihood Sequence Estimation (MLSE) techniques such as Fano's algorithm, stack decoding or retain "k-best" path are then used to decide on the best sent sequence. The second algorithm considers the different metrics in N-dimensional space and uses a survivor algorithm to select the best sent sequence. The third algorithm uses QR decomposition to reduce the N-dimension space and then uses a survivor algorithm.

J Li, K. B. Letaief, et al, "Multi-stage Low Complexity Maximum Likelihood Detection for OFDM/SDMA Wireless LANs", IEEE International Conference on Communications (ICC#2001), Helsinki, Finland, 11-14 Feb. 2001, Vol. 4, pp. 1152-1156. The algorithm described in this paper is a 2-stage algorithm. The first stage of the algorithm uses a conventional detection method like Minimum Mean Square Error (MMSE) or Interference cancellation (IC). From this stage, "sensitive bits" (where "sensitive bits" as bits which are likely to be in error) are identified and passed to the second stage. The second stage of the algorithm uses Maximum Likelihood Detection (MLD). Since MLD for this algorithm only operates on the sensitive bits (which are sub-set of the total bits) complexity is reduced.

Jacky Ho-Yin Fan et al, "A Sub optimum MLD Detection scheme for Wireless MIMO Systems", IEEE International Symposium on Advances in Wireless Communications (ISWC) 2002, Victoria, Canada. The algorithm discussed in this paper is similar to the algorithm discussed in (3). The algorithm consists of two stages. The first stage performs a conventional detection scheme like, Zero Forcing (ZF) or V-BLAST. If the error probability of the symbols (or vectors of symbols) from the first stage, are above a certain threshold, they are then passed to the section stage in which MLD is performed. Since only a subset of the symbols, are passed to the second stage, the complexity is reduced.

As described above, before the comparisons for each subcarrier in equation (4) can be performed, the vector products $H_m s_m$ have to be formed for each of the possible sent signals $s_m$ ($s_m \in A$). Traditionally for state of the art equalisers, all of the $H_m s_m$ products would be calculated once all of the channel estimates $\hat{h}_{m,ji}$ ($i=1 \ldots n_R$, $j=1 \ldots n_T$) have been obtained. Since data information symbols are traditionally transmitted shortly after the pilot tones, the state of art equaliser has a very short period of time to calculate all of the $H_m s_m$ products and therefore the corresponding peak processing requirements are very high.

SUMMARY OF THE INVENTION

The object of the present invention is to provide an equalising structure and method for a receiving device of a wireless communication system and a system of transmitting and receiving device, in which two or more information signals are transmitted in parallel from one or more transmitters, wherein for the information signals transmit information is modulated onto carrier signals according to a modulation scheme, whereby all possible data symbols are represented as constellation points in the signal constellation of the modulation scheme and whereby the equalizing structure performs, for each information signal, a maximum likelihood detection in order to determine a constellation point with a minimum Euclidean distance to a received signal vector as a most likely received signal vector by searching over the whole set of possible transmit signals, with which the required computing power can be reduced.

The above object is achieved by an equalising structure and an equalising method as described herein.

The equalising structure according to the present invention comprises detecting means for detecting channel estimation information in the information signals and calculating means for calculating the product of channel matrix $H_m$ and transmit signal vector $s_m$ based on the channel estimation information detected by the detecting means, wherein the product of channel matrix $H_m$ and transmit signal vector $s_m$ is calculated in at least two steps, wherein in the first step a partial product of channel matrix $H_m$ and transmit signal vector $s_m$ is calculated based on at least one or a part of the channel estimation information detected by the detecting means.

With the present invention the MDL processing is split into two or more parts, wherein the first part is started as soon as the first channel estimate(s) is/are available. Once all of the partial results have been formed, they are then summed to form the final rows of the $H_m s_m$ column vector, or alternatively the accumulated sum of the partial results is computed as the channel estimates are obtained. In this way MDL processing is spread over time, the peak required operations (i.e. multiplications, additions and subtractions) can be drastically reduced and thus, the required computing power (calculations/time) for the MDL processing is reduced.

The equalising method according to the present invention comprises the steps of detecting channel estimation information in the information signals and calculating the product of channel matrix $H_m$ and transmit signal vector $s_m$ based on the channel estimation information detected, wherein the product of channel matrix $H_m$ and transmit signal vector $s_m$ is calculated in at least two steps, wherein in the first step a partial product of channel matrix $H_m$ and transmit signal vector $s_m$ is calculated based on at least one or a part of the channel estimation information detected.

The present invention further relates to a computer program product directly loadable into the internal memory of a receiving device for receiving information in a wireless communication system, comprising software code portions for performing the method steps of the method according to the present invention when the product is run in the receiving device.

The present invention further relates to a receiving device for receiving signals in a wireless communication system, comprising two or more antennas for receiving signals, with an equalising structure according to the present invention for processing the signals received by the antennas. In other words, the equalising structure according to the present invention is advantageously implemented into a receiving device of a MIMO system.

The present invention further relates to a system of transmitting and receiving device, in which the transmitting device comprises $n_T$ transmitter antennas for transmitting the information signals and the receiving device comprises $n_R$ receiver antennas for receiving the information signals, wherein channel estimation information from the different transmitter antennas are transmitted with a time offset with respect to each other and, in the receiving device, the product of channel matrix $H_m$ and transmit signal vector $s_m$ is calculated in $n_T$ steps, wherein in the first step a partial product of channel matrix $H_m$ and transmit signal vector $s_m$ based on the first channel estimation information received by all receiver antennas is calculated.

For further reduction of the complexity of the maximum likelihood detection, the equalizing structure according to the present invention comprises dividing means for dividing the constellation points into two or more groups of constellation points, allocating means for allocating a representative signal vector to each of the formed groups, first detecting means for performing a maximum likelihood detection in order to determine one or more of the representative signal vectors having a minimum Euclidean distance to the received signal vector, and second detecting means for performing a maximum likelihood detection in order to determine which one of the constellation points in the group(s) of the one or more determined representative signal vectors has the minimum Euclidean distance to the received signal vector. In this way, the large number of comparisons can be reduced.

BRIEF DESCRIPTION OF THE DRAWING

In the following description, the present invention is further explained in relation to the enclosed drawings, in which FIG. 6 shows an example of a 16 QAM constellation scheme, FIG. 7 shows an example for a constellation division for a 16 QAM constellation scheme, FIG. 8 shows an example for a constellation split for 16 QAM modulation scheme with 9 overlapping regions, and FIG. 9 shows a constellation scheme with one selected constellation point group to be further processed.

DETAILED DESCRIPTION

Generally, for MLD implementations in communications systems, a preamble including pilots for channel estimation is sent followed by data. Once the channel matrix $H_m$ is known (via channel estimation during the preamble period $T_P$), the complete set of vector product $H_m s_m$ can be formed. This means that during the data phase $T_D$ only the comparisons need to be computed. With the present invention the peak processing power, which is needed to form/calculate the $H_m s_m$ products, is reduced.

Figure 1:
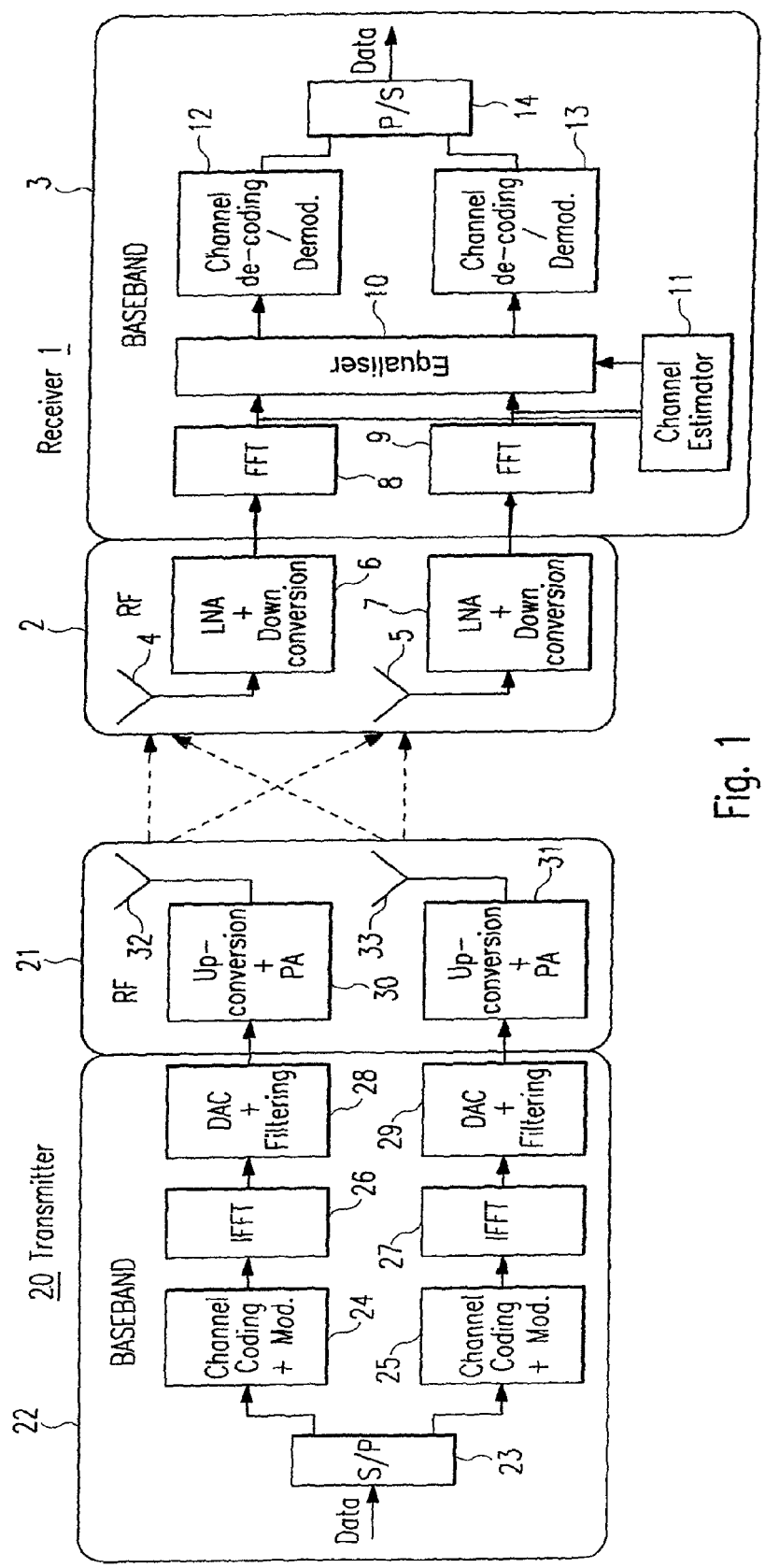
FIG. 1 shows a schematic block diagram of a typical MIMO communication system, FIG. 2 schematically shows a block diagram of an equalising structure according to a first embodiment of the present invention, FIG. 3 schematically shows the frame structure of signals transmitted in a 2×2 MIMO channel communication system according to a first embodiment of the present invention, FIG. 4 schematically shows the frame structure of signals transmitted in a 3×3 MIMO channel communication system according to the first embodiment of the present invention, FIG. 5 schematically shows a block diagram of an equalising structure according to a second embodiment of the present invention.
Figure 2:
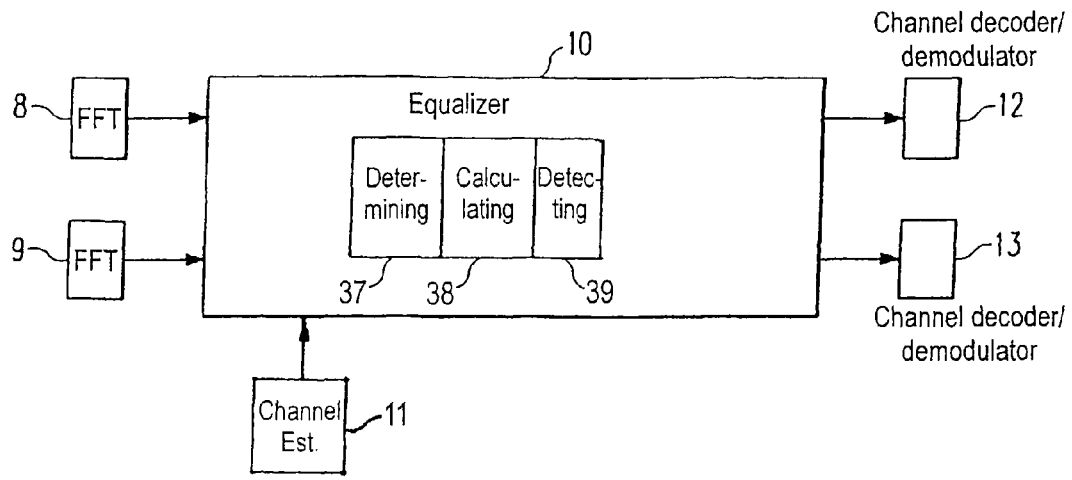

An equalising structure according to the first embodiment of the present invention is schematically shown in FIG. 2. The equalising structure 10 can hereby be comprised in a receiver 1 as shown in FIG. 1. In this case, the equalising structure 10 is adapted to perform a maximum likelihood detection on two parallel incoming signal streams from the fast fourier transformers 8 and 9, respectively. Although the equalising structure 10 and method according to the present invention are particularly advantageous for use in MIMO communication systems with a plurality of transmitting and receiving antennas, it is to be noted that the present invention can also advantageously be applied to receiving structures with only a single receiving antenna. Further, the present invention can be applied to receiving devices in any kind of wireless communication system, e.g. the GSM, the UMTS or any other suitable wireless communication system, any kind of paging system, any kind of short range communication system, such as wireless LAN systems and so forth. Further, the receiving device according to the present invention can be any kind of electronic equipment adapted to receive wireless signals in a wireless communication system, such as a pager, a personal digital assistant, an electronic equipment for wireless telecommunication, such as a portable phone and so forth.

As shown in FIG. 2, the equalising structure 10 comprises a determining means 30 for determining the order and stages in which the $H_m s_m$ product has to be calculated, a calculating means 31 for calculating the $H_m s_m$ products and a means 32 for performing the number of comparisons that have to be made in equation (4) for each sub-carrier to decide in favour of the transmit signal vector $\hat{s}_m$ which has the minimum Euclidean distance to the receive vector $x_m$. It is to be noted that the determining means 37, the calculating means 38 and the detecting means 39 can be implemented in any kind of suitable hardware and/or software structure. For example, the determining means 37, the calculating means 38 and the detecting means 39 could be implemented as a computer programme product directly loadable into an internal memory of a receiving device 1, whereby the computer programme product comprises software portions for performing the method steps as described further below.

In the following description, the method steps performed in the determining means 37, the calculating means 38 and the detecting means 39 are explained in more detail.

Figure 3:
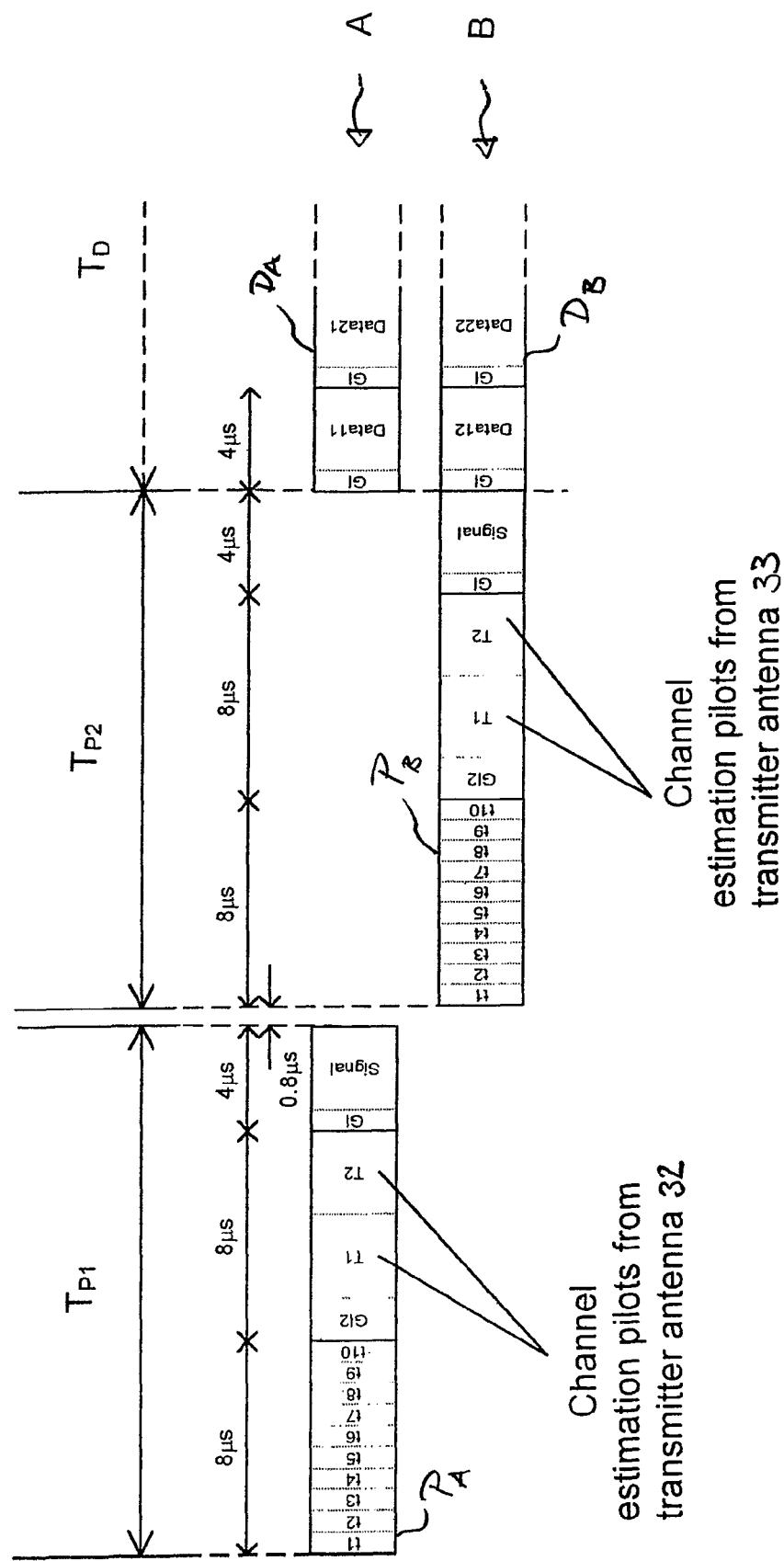

FIG. 3 schematically shows the frame structure of signals A and B transmitted in the example MIMO communication system shown in FIG. 1. In the signals A and B which are transmitted in parallel via the transmit antennas 32 and 33 respectively, pilot bursts (labelled as T1 and T2) are contained within an associated preamble burst $P_A$, $P_B$ followed by data $D_A$, $D_B$. This is a typical example for a wireless local area network (WLAN) in which the structure has four distinct sections. The first is the short preamble (initial training sequence t1 . . . t10) followed by a long preamble (further training sequence T1, T2) and, finally, by the signal and data symbols. Guard Intervals (GI) are inserted between each section. It is to be noted, that the signal A may be sent from a transmitter A whereas the signal B is sent from a transmitter B.

According to the first embodiment of the present invention, the channel estimates transmitted from the transmitter antennas 32 and 33, respectively, are time offset from each other. As shown in FIG. 3, the preamble $P_A$ of signal A including pilots T1, T2 for the channel estimation is transmitted in interval $T_{P1}$ followed by a delay of 0.8 μs, interval $T_{P2}$ in which the preamble $P_B$ of signal B is transmitted and interval $T_D$ in which data of signal A and B are transmitted simultaneously. It is to be noted, that it is not essential that the pilots are contained with a preamble, just that channel estimates transmitted from the antennas are time offset from each other. It is to be noted further, that channel estimation may be performed on preambles, pilot-carriers, training symbols and/or even the carried data. Further, it is to be noted that the equalising structure 10 and the corresponding equalising method of the present invention are not restricted to the processing of two parallel received signal streams, but can be used for the processing of any other number of parallel received data streams. The frame structure of signals transmitted in a 3×3 MIMO channel communication system according to the first embodiment of the present invention is shown in FIG. 4.

Figure 4:
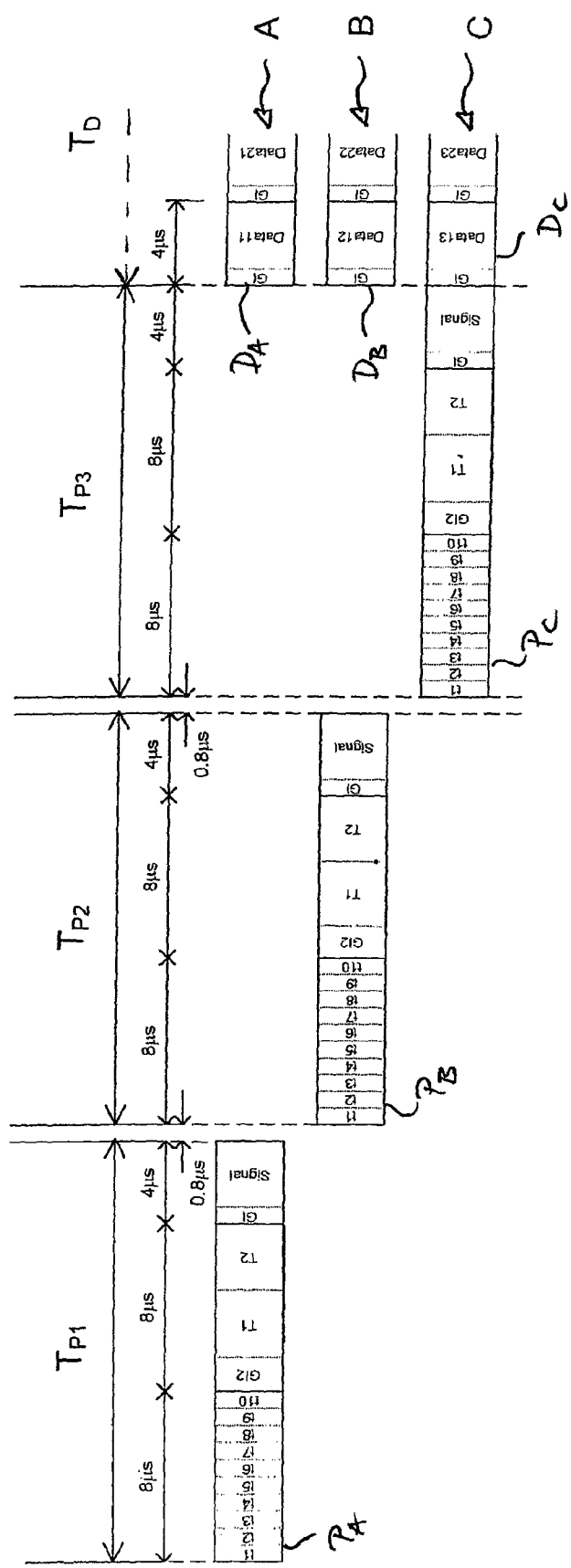

When the signals are transmitted in line with the frame structure as shown in FIG. 3 or FIG. 4, all receiver antennas receive channel estimation pilots from the transmit antennas after each other. In such an arrangement, the $H_m s_m$ ($n_R \times 1$) column vector is calculated by the calculating means 38 in stages as shown in equation (7). Each stage corresponds to the channel estimate from one of the transmit antennas and therefore one column of the channel estimation matrix. In each stage the calculating means 31 calculates the partial results for the rows of the $H_m s_m$ vectors as soon as the channel estimates from the pilots for the respective transmitter antenna are obtained. This process is described mathematically in equations (10), (11) and (12) for stage 1 (channel estimation from transmit antenna 1), stage 2 (channel estimate from transmit antenna 2) and for stage $n_T$ (channel estimation from the transmit antenna $n_T$) for a system with $n_T$ transmitter antennas respectively.

$$H_m s_m(\text{stage}1) = \begin{bmatrix} \hat{h}_{m,11} & 0 & \cdots & 0 \\ \hat{h}_{m,21} & 0 & \cdots & 0 \\ \cdots & \cdots & \cdots & \cdots \\ \hat{h}_{m,n_R 1} & 0 & \cdots & 0 \end{bmatrix} \begin{bmatrix} s_{m,1} \\ s_{m,2} \\ \cdots \\ s_{m,n_T} \end{bmatrix} \quad (10)$$

$$= \begin{bmatrix} Hs_{m,1}(\text{stage}1) \\ Hs_{m,2}(\text{stage}1) \\ \cdots \\ Hs_{m,n_T}(\text{stage}1) \end{bmatrix}$$

$$H_m s_m(\text{stage}2) = \begin{bmatrix} 0 & \hat{h}_{m,12} & \cdots & 0 \\ 0 & \hat{h}_{m,22} & \cdots & 0 \\ \cdots & \cdots & \cdots & \cdots \\ 0 & \hat{h}_{m,n_R 2} & \cdots & 0 \end{bmatrix} \begin{bmatrix} s_{m,1} \\ s_{m,2} \\ \cdots \\ s_{m,n_T} \end{bmatrix} \quad (11)$$

$$= \begin{bmatrix} Hs_{m,1}(\text{stage}2) \\ Hs_{m,2}(\text{stage}2) \\ \cdots \\ Hs_{m,n_T}(\text{stage}2) \end{bmatrix}$$

$$H_m s_m(\text{stage } n_T) = \begin{bmatrix} 0 & 0 & \cdots & \hat{h}_{m,1n_T} \\ 0 & 0 & \cdots & \hat{h}_{m,2n_T} \\ \cdots & \cdots & \cdots & \cdots \\ 0 & 0 & \cdots & \hat{h}_{m,n_R n_T} \end{bmatrix} \begin{bmatrix} s_{m,1} \\ s_{m,2} \\ \cdots \\ s_{m,n_T} \end{bmatrix} \quad (12)$$

$$= \begin{bmatrix} Hs_{m,1}(\text{stage } n_T) \\ Hs_{m,2}(\text{stage } n_T) \\ \cdots \\ Hs_{m,n_T}(\text{stage } n_T) \end{bmatrix}$$

Once all of the partial results have been formed, they are then summed to form the final rows of the $H_m s_m$ column vector. This is shown in equation (13).

$$H_m s_m = \begin{bmatrix} \sum_{i=1}^{n_T} Hs_{m,1}(\text{stage } i) \\ \sum_{i=1}^{n_T} Hs_{m,2}(\text{stage } i) \\ \cdots \\ \sum_{i=1}^{n_T} Hs_{m,n_T}(\text{stage } i) \end{bmatrix} \quad (13)$$

Alternatively the accumulated sum of the partial results can be computed as the channel estimates are obtained. By calculating the $H_m s_m$ matrix in stages, the processing needed, can be distributed over time, since the channel estimates are offset in time. This in turn reduces drastically the peak processing requirements. The smallest possible stage corresponds to a $H_m$ (stage i) matrix having zero-elements and only one element of channel estimate $h_{m,ij}$ (i=1 ... $n_R$, j=1 ... $n_T$) from one transmit antenna and one receiver antenna. In this case channel estimates from the other receiver antennas ($n_R$−1) have to be stored or the transmitter has to transmit the pilots from each transmit antenna i=1 ... $n_R$ times.

Figure 5:
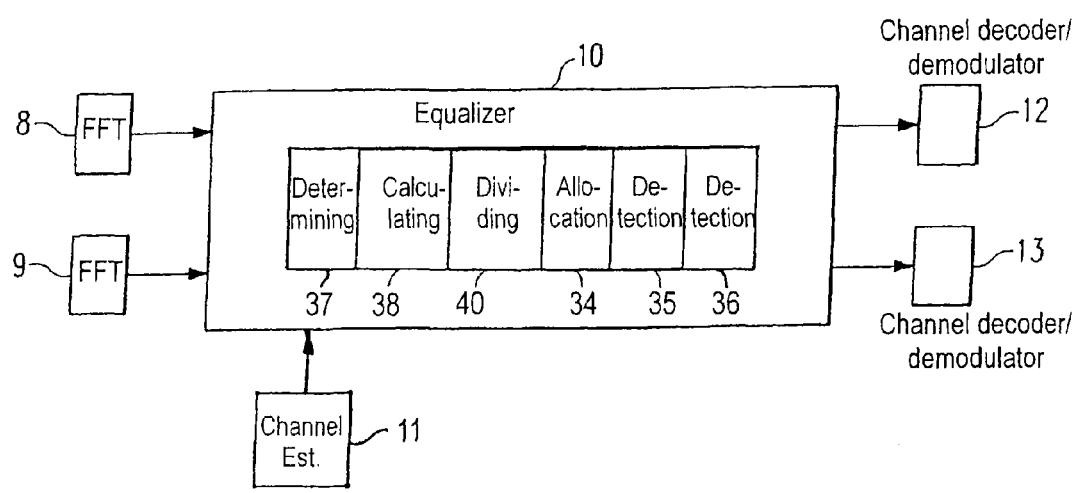

FIG. 5 schematically shows a block diagram of an equalising structure according to a second embodiment of the present invention. As shown in FIG. 5, the equalising structure 10 comprises the determining means 37 for determining the order and stages in which the $H_m s_m$ product has to be calculated and the calculating means 38 for calculating the $H_m s_m$ products. Further, the equalising structure 10 comprises a dividing means 40 for dividing the constellation points of the respectively used modulation scheme into two or more groups of constellation points, an allocating means 34 for allocating a representative signal vector to each of the formed groups, a first detecting means 35 for performing a maximum likelihood detection in order to determine one or more of the representative signal vectors having the minimum Euclidean distance to the received signal vector, and a second detecting means 36 for performing a maximum likelihood detection in order to determine which one of the constellation points in the group(s) of the one or more determined representative signal vectors has the minimum Euclidean distance to the received signal vector.

In the dividing means 40 the constellation space is split into a number of zones and the maximum likelihood processing is split into a number of steps, ST, e.g. ST=2. In each successive step the equalising structure 10 or detector "zooms in" on the most likely sent symbols from each antenna and hence the most likely sent symbol vector. Once the most likely sent symbol vector has been found, the selected sent vector can be optionally further processed using state of the art techniques to produce a soft output (containing reliability information). In the following this method is referred to as Sub-Constellation Space Maximum Likelihood Detection (SCS-MLD).

FIG. 6 shows a typical 16 QAM constellation, where there are 4 constellation points in each quadrant. For the first step of SCS-MLD the constellation point are grouped into rectangular zones by the dividing means 40. There are many different ways to do this.

FIG. 7 shows a constellation split in which there are 4 non-overlapping zones and each zone contains 4 constellation points. Alternatively one or more of the zones can overlap each other which results in an increased number of zones. The extreme case of all of zones overlapping, results in 9 zones, and this is shown in FIG. 8.

To illustrate the method it is assumed that the constellation is split into four zones as shown in FIG. 7 and that the processing is achieved in 2 steps (ST=2). The general principle can however be applied to any high level modulation scheme, any constellation split and may be processed in more than 2 steps. Hereby, additional detecting means could be implemented in addition to the first and second detecting means 35, 36 or the further detecting steps could be performed by the first and/or the second detecting means 35, 36.

The goal of the first step is to determine from which zone the most likely sent constellation point came from. To achieve this, it is assumed that the transmitted signals from the different antennas are the centres of the different zones (These are marked as crosses in FIG. 7).

The first detecting means 35 searches over the set of all possible transmitted zones to decide in, favour of the transmit signal vector which belongs to the zone which has the minimum Euclidean distance to the receive vector.

Once the most likely sent combination of constellation zones from the different antennas has been identified in the first detecting means 35, the second step (in this example last step) concentrates on the points in these zones. This is shown in FIG. 9.

The second detecting means 36 then search over all the possible sent vectors to decide in favour of the sent vector which has the minimum Euclidean distance to the receive vector.

Furthermore, by increasing the overlapping between the assigned zones (such as shown in FIG. 8), the possibility of making a zone decision error can be reduced. However, by increasing the number of zones the comparisons for the respective step is also increased. The optimal number of zones for each step and the number of zones, which are passed through to the next step, need to be carefully considered to reduce the complexity for a given performance.

In the equalising structure shown in FIG. 5 the maximum likelihood detection is separated in two (or more steps), whereby each step uses a maximum likelihood detection and whereby the detection gets finer from step to step.

The invention claimed is:

1. An equalizing structure for a receiving device of a wireless communication system, in which two or more information signals are transmitted in parallel from one or more transmitters, wherein for the information signals transmit information is modulated onto carrier signals according to a modulation scheme, whereby all possible data symbols are represented as constellation points in a signal constellation of the modulation scheme and whereby the equalizing structure performs, for each information signal, a maximum likelihood detection to determine a constellation point with a minimum Euclidean distance to a received signal vector as a most likely received signal vector by searching over a whole set of possible transmitted signals, the equalizing structure comprising:
a channel estimator for detecting channel estimation information in the information signals; and
calculating means for calculating a product of channel matrix and transmit signal vector based on the channel estimation information detected by the channel estimator,
wherein the calculating means calculates the product of channel matrix and transmit signal vector, wherein a partial product of channel matrix and transmit signal vector based on at least one or a part of the channel estimation information detected by the channel estimator is calculated.

2. An equalizing structure for a receiving device of a wireless communication system according to claim 1, wherein
the equalizing structure is configured to receive, via $n_R$ receiver antennas, information signals from $n_T$ transmitter antennas, wherein, in the information signals, reference signals used for channel estimation sent from different transmitter antennas are time offset from each other; and
the calculating means calculates the product of channel matrix and transmit signal vector in $n_T$ steps, wherein in a first step a partial product of channel matrix and transmit signal vector based on a first received reference signal used for channel estimation by all receiver antennas is calculated.

3. An equalizing structure for a receiving device of a wireless communication system according to claim 2, further comprising:
storage means for storing channel estimation information received by each of the receiver antennas.

4. An equalizing structure for a receiving device of a wireless communication system according to claim 1, further comprising:
dividing means for dividing the constellation points into two or more groups of constellation points;
allocating means for allocating a representative signal vector to each of the formed groups;
first detecting means for performing a maximum likelihood detection to determine one or more of the representative signal vectors having the minimum Euclidean distance to the received signal vector; and
second detecting means for performing a maximum likelihood detection to determine which one of the constellation points in the two or more groups of the one or more determined representative signal vectors has the minimum Euclidean distance to the received signal vector.

5. A receiving device for receiving multi-carrier signals in a wireless communication system, comprising:
two or more antennas for receiving signals, with an equalizing structure according to claim 1 for processing the signals received by the antennas.

6. An equalizing method for equalizing signals transmitted and received in a wireless communication system, in which two or more information signals are transmitted in parallel from one or more transmitters to one or more receivers, wherein for the information signal transmit information is modulated onto carrier signals according to a modulation scheme by a modulator, whereby all possible data symbols are represented as constellation points in a signal constellation of the modulation scheme, and whereby the equalizing structure performs, for each information signal, a maximum likelihood detection to determine a constellation point with a minimum Euclidean distance to a received signal vector as a most likely received signal vector by searching over a whole set of possible transmitted signals, the equalizing method comprising:
detecting channel estimation information in the information signals by a channel estimator; and
calculating a product of channel matrix and transmit signal vector by a calculating means based on the channel estimation information detected by the channel estimator,
wherein the product of channel matrix and transmit signal vector is calculated, wherein a partial product of channel matrix and transmit signal vector based on at least one or a part of the channel estimation information detected is calculated.

7. An equalizing method according to claim 6, wherein
in the wireless communication system, information signals from $n_T$ transmitter antennas are received via $n_R$ receiver antennas, wherein, in the information signals, reference signals used for channel estimation sent from different transmitter antennas are time offset from each other; and
the product of channel matrix and transmit signal vector is calculated in $n_T$ steps, wherein in a first step a partial product of channel matrix and transmit signal vector based on a first reference signal used for channel estimation received by all receiver antennas is calculated.

8. An equalizing method according to claim 7, further comprising:
storing channel estimation information received by each of the receiver antennas.

9. An equalizing method according to claim 6, further comprising:
dividing the constellation points into two or more groups of constellation points;
allocating a representative signal vector to each of the formed groups;
performing a first maximum likelihood detection to determine one or more of the representative signal vectors having the minimum Euclidean distance to the received signal vector; and
performing a further maximum likelihood detection to determine which one of the constellation points in the two or more groups of the one or more determined representative signal vectors has the minimum Euclidean distance to the received signal vector.

10. A non-transitory computer-readable storage medium directly loadable into a receiving device for receiving information in a wireless communication system, comprising:
software code portions for causing the receiving device to perform the method of claim 6 when the software code portions are executed on the receiving device.

11. A system of transmitting and receiving, in which two or more information signals are transmitted in parallel, wherein for the information signals transmit information is modulated onto carrier signals according to a modulation scheme, whereby all possible data symbols are represented as constellation points in a signal constellation of the modulation scheme, and whereby the equalizing structure performs, for each information signal, a maximum likelihood detection to determine a constellation point with a minimum Euclidean distance to a received signal vector as a most likely received signal vector by searching over a whole set of possible transmitted signals, a receiving device of the system comprising:
a channel estimator for detecting channel estimation information in the information signals; and
calculating means for calculating a product of channel matrix and transmit signal vector based on the channel estimation information detected by the channel estimator,
wherein the calculating means calculates the product of channel matrix and transmit signal vector, wherein a partial product of channel matrix and transmit signal vector based on at least one or a part of the channel estimation information detected by said channel estimator is calculated.

12. A system according to claim 11, wherein
a transmitting device comprises $n_T$ transmitter antennas for transmitting the information signals and the receiving device comprises $n_R$ receiver antennas for receiving the information signals;
the transmitting device is configured to transmit reference signals used for channel estimation from different transmitter antennas with a time offset with respect to each other; and
the calculating means calculates the product of channel matrix and transmit signal vector in $n_T$ steps, wherein in a first step a partial product of channel matrix and transmit signal vector based on a first received reference signal used for channel estimation by all receiver antennas is calculated.

13. An equalizing structure for a receiving device of a wireless communication system, in which two or more information signals are transmitted in parallel from one or more transmitters, wherein the transmit information is modulated onto carrier signals according to a modulation scheme, wherein all possible data symbols are represented as constellation points in a signal constellation of the modulation scheme and wherein the equalizing structure performs, for each information signal, a maximum likelihood detection to determine a constellation point having a minimum Euclidean distance to a received signal vector as a most likely received signal vector by searching over a whole set of possible transmitted signals, the equalizing structure comprising:
a channel estimator that detects channel estimation information in the information signals; and
a calculator that calculates a product of channel matrix and transmit signal vector based on the channel estimation information detected by the channel estimator,
wherein the calculator calculates the product of channel matrix and transmit signal vector wherein a partial product of channel matrix and transmit signal vector based on at least one or a part of the channel estimation information detected by the channel estimator is calculated.

14. A receiving device for receiving multi-carrier signals in a wireless communication system, comprising:
two or more antennas for receiving signals, with an equalizing structure according to claim 13 for processing the signals received by the antennas.

* * * * *